(12) United States Patent
Sekiguchi

(10) Patent No.: US 6,898,627 B1
(45) Date of Patent: May 24, 2005

(54) COMMUNICATION DEVICE HAVING THE CAPABILITY OF PERFORMING INFORMATION EXCHANGE BETWEEN A FACSIMILE MEDIUM AND AN ELECTRONIC INFORMATION MEDIUM SUCH AS AN E-MAIL MEDIUM

(75) Inventor: Kenzou Sekiguchi, Machida (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/698,255

(22) Filed: Oct. 30, 2000

Related U.S. Application Data

(62) Division of application No. 09/112,318, filed on Jul. 9, 1998.

(30) Foreign Application Priority Data

Jul. 25, 1997 (JP) .............................................. 9/200125

(51) Int. Cl.[7] .............................................. G06F 15/16
(52) U.S. Cl. ........................ 709/217; 709/206; 709/227; 370/386
(58) Field of Search ................................ 709/217, 224, 709/227, 228, 200, 201, 220, 299, 204, 206, 222; 370/389; 707/200

(56) References Cited

U.S. PATENT DOCUMENTS

| | | | |
|---|---|---|---|
| 4,941,170 A | | 7/1990 | Herbst .................... 379/100.08 |
| 5,095,445 A | | 3/1992 | Sekiguchi .................... 364/514 |
| 5,293,250 A | | 3/1994 | Okumura et al. ........... 358/402 |
| 5,557,723 A | * | 9/1996 | Holt et al. ................... 709/200 |
| 5,608,786 A | | 3/1997 | Gordon ................ 379/100.08 |
| 5,619,648 A | * | 4/1997 | Canale et al. ................ 709/201 |
| 5,765,170 A | * | 6/1998 | Morikawa ................... 707/200 |
| 5,767,985 A | | 6/1998 | Yamamoto ................. 358/402 |
| 5,790,790 A | | 8/1998 | Smith et al. ................. 709/206 |
| 5,859,967 A | | 1/1999 | Kaufeld ....................... 713/200 |
| 5,881,233 A | | 3/1999 | Toyoda ........................ 709/233 |
| 5,896,504 A | | 4/1999 | Shiraki ........................ 709/206 |
| 5,911,776 A | * | 6/1999 | Guck .......................... 709/217 |
| 5,918,013 A | * | 6/1999 | Mighdoll et al. ........... 709/217 |
| 5,943,400 A | | 8/1999 | Park ......................... 379/88.02 |
| 5,951,636 A | * | 9/1999 | Zerber ........................ 709/202 |
| 5,974,449 A | | 10/1999 | Chang ........................ 709/206 |
| 6,035,104 A | * | 3/2000 | Zahariev ..................... 709/206 |
| 6,038,601 A | * | 3/2000 | Lambert et al. ............ 709/226 |
| 6,141,695 A | | 10/2000 | Sekiguchi .................... 709/246 |
| 6,157,630 A | * | 12/2000 | Adler et al. ................. 370/338 |
| 6,167,441 A | * | 12/2000 | Himmel ...................... 709/217 |
| 6,189,027 B1 | * | 2/2001 | Haneda et al. .............. 709/206 |
| 6,345,256 B1 | * | 2/2002 | Milsted et al. ................. 705/1 |
| 6,453,327 B1 | * | 9/2002 | Nielsen ....................... 715/500 |
| 6,581,092 B1 | * | 6/2003 | Motoyama et al. ......... 709/219 |

FOREIGN PATENT DOCUMENTS

| | | |
|---|---|---|
| EP | 0565850 A | 10/1993 |
| WO | 8707801 A | 12/1987 |
| WO | 9510081 A | 4/1995 |

OTHER PUBLICATIONS

Patel et al., "The Multimedia Fax–MIME Gateway", IEEE Multimedia, vol. 1, No. 4, Dec. 21, 1994, pp. 64–70.

* cited by examiner

*Primary Examiner*—Zarni Maung
*Assistant Examiner*—Khanh Quang Dinh
(74) *Attorney, Agent, or Firm*—Fitzpatrick, Cella, Harper & Scinto

(57) ABSTRACT

A communication device allows a user to get access from the outside via an external public line to obtain e-mail data stored in a device connected to an internal system via a computer network such as a LAN without causing a reduction in security. More specifically, the communication device is connected to a LAN via a LAN I/F and also connected to the public line via a line I/F. If the communication device receives a remote operation command via the public line, a CPU of the communication device gets access to a post office of an e-mail server so as to get e-mail data in accordance with the remote operation command. The obtained e-mail data is converted to facsimile image data and transmitted by means of facsimile to a specified destination.

11 Claims, 16 Drawing Sheets

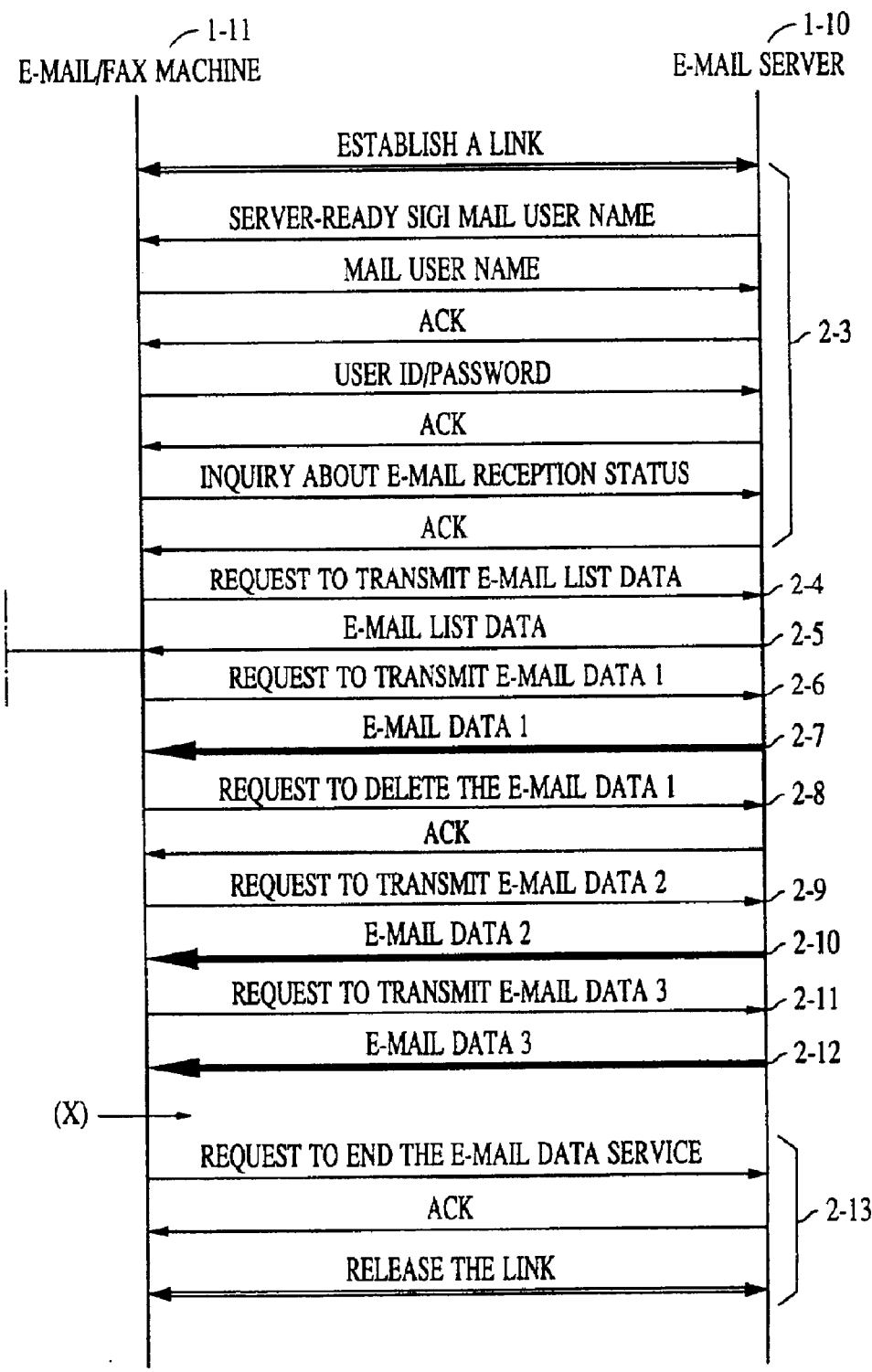

FIG. 4

From : aaa @ bbb. ccc. dd. ee
To : fff @ ggg. hhh. ii. jj
Subject : Fax expansion functions
Mime-Version : 1.0
Content-type : Multipart/Mixed ;
boundary = " ··· Boundary ··· "
Date : Thu, 4 Jul 1996 21 : 00 : 00 + 0999
Message-Id : <19960704215959. TAA99999 @ xxx. ccc. dd. ee>

HEADER

···Boundary···
Content-type : Text/Plain ; charset = iso-2022-jp

Facsimile data from aaa @ bbb. ccc. dd. ee to fff @ ggg. hhh. ii. jj

BODY 1

···Boundary···
Content-type : message/external-body ; access-type = ANON-FTP ;
site = " aaa. bbb. cc. dd " ; directory = " fax "
name = " file19960704215959. xxx "
content-type : image/iff
content-ID : <19960704215959. TAA99999FILE @ xxx. ccc. dd. ee>
Content-Transfer-Encoding : binary

THIS IS PHANTOM BODY

···Boundary···

BODY 2

FIG. 5

FROM : aaa @ bbb. ccc. dd. ee
TO : fff @ ggg. hhh. ii. jj
REGARDING : Fax expansion functions
DATE : July 4, 1996 (Thur.)  21:00

Facsimile data from aaa @ bbb. ccc. dd. ee to fff @ ggg. hhh. ii. jj

[One page of facsimile data is appendid.]

[END OF THE MESSAGE]

FIG. 7

* * * RECEIVED MAIL * * *

FROM : aaa @ bbb. ccc. dd. ee
TO : fff @ ggg. hhh. ii. jj
REGARDING : Fax expansion functions
DATE : July 4, 1996 (Thuu.)  21:00

Facsimile Data from aaa @ bbb. ccc. dd. ee to
fff @ ggg. hhh. ii. jj

FACSIMILE DATA FROM aaa @ bbb. ccc. dd. ee to fff @ ggg. hhh. ii. jj

[THE COLOR IMAGE DATA LISTED BELOW IS ALSO RECEIVED
BUT THIS MACHINE IS NOT CAPABLE OF DEALING WITH IT]

[YOU CAN GET IT VIA YOUR COMPUTER]

Content-type : message/external-body ;
access-type = local-file ;
name = " /fax/aaa/tiff19960704215959. xxx "
content-type : image/jpg
content-ID <19960704215959. TAA99999TIFF @ xxx. ccc. dd. ee>
Content-Transfer-Encoding : binary

[END OF THE MESSAGE]

FIG. 8

\* \* \* \*  MAIL LIST  \* \* \* \*

There are 3 mails received.

Mail Access Number : 1
FROM : aaa @ bbb. ccc. dd. ee
TO : fff @ ggg. hhh. ii. jj
REGARDING : Subject1
DATE : July 4, 1996 (Thur.), 9:00
RECEPTION STATUS : No Error Mail Access Number : 2
FROM : kkk @ lll. ccc. dd. ee
TO : fff @ ggg. hhh. ii. jj
REGARDING : Fax expansion functions
DATE : July 4, 1996 (Thur.), 10:00
RECEPTION STATUS : Invalid Data Mail Access Number : 3
FROM : mmm @ lll. ccc. dd. ee
TO : fff @ ggg. hhh. ii. jj
REGARDING : Fax expansion functions
DATE : July 4, 1996 (Thur.), 10:00
RECEPTION STATUS : Memory Overflow Error

[END OF THE MAIL LIST]

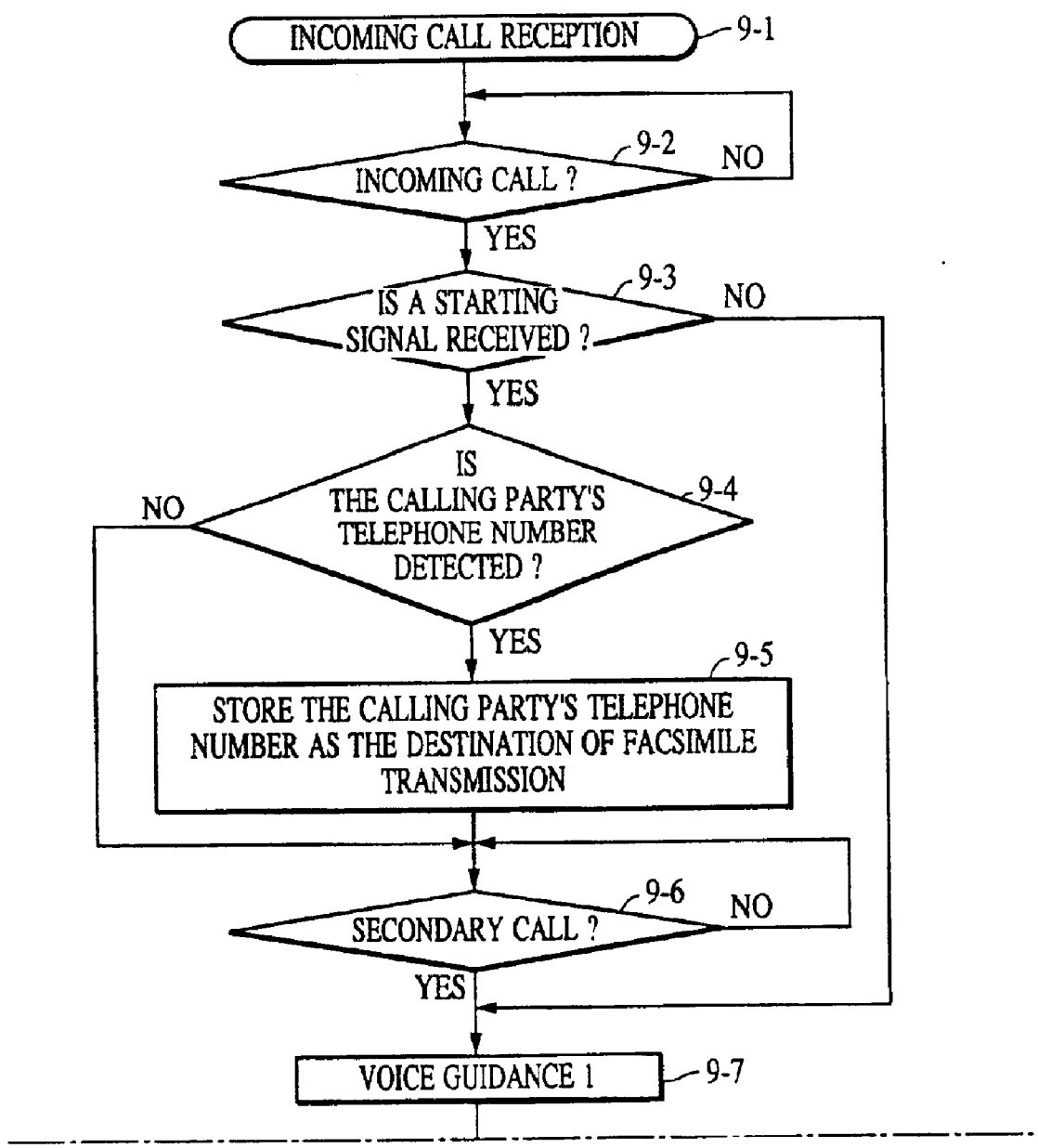

FIG. 12

| | | |
|---|---|---|
| 11-1 | E-MAIL SERVER IP ADDRESS "192. 33. 22. 11" | |
| 11-2 | NUMBER OF POST OFFICES "10" | |
| 11-3 | POST OFFICE NAME "username 1" | POST OFFICE ARRAY [1] |
| 11-4 | FACSIMILE/E-MAIL CONVERTING OPERATION MODE "SCHEDULED AND REMOTE MODE" | |
| 11-5 | MAIL READING MODE "HEADER ONLY" | |
| 11-6 | SCHEDULED READING INTERVALS "ONE HOUR" | |
| 11-7 | USER ID "3939" | DESIGNATION OF REMOTE ACCESSING OPERATION |
| 11-8 | PASSWORD "8280" | |
| 11-9 | MAIL READING MODE "MAIL BODY" | |
| 11-10 | DEFAULT FACSIMILE DESTINATION "03-3737-3636" | |
| 11-11 | ONLINE-SPECIFIED FACSIMILE DESTINATION "03-3737-5656" | |
| 11-12 | NUMBER OF FACSIMILE DESTINATIONS "1" | DESIGNATION OF FACSIMILE TRANSMISSION |
| 11-13 | FACSIMILE DESTINATION [1] "093-111-2222" | |

11-20

| | | |
|---|---|---|
| 11-31 | POST OFFICE NAME "fff" | POST OFFICE ARRAY [1] |
| 11-32 | FACSIMILE/E-MAIL CONVERTING OPERATION MODE "SCHEDULED" | |
| 11-33 | MAIL READING MODE "MAIL BODY" | |
| 11-34 | SCHEDULED READING INTERVALS "20 MIN" | |
| | ⋮ | DESIGNATION OF REMOTE ACCESSING OPERATION |
| 11-35 | NUMBER OF FACSIMILE DESTINATIONS "1" | DESIGNATION OF FACSIMILE TRANSMISSION |
| 11-36 | FACSIMILE DESTINATION [1] "093-111-2222" | |

11-40 ⟶ 11-30

| | |
|---|---|
| POST OFFICE NAME "username 10" | POST OFFICE ARRAY [1] |
| FACSIMILE/E-MAIL CONVERTING OPERATION MODE "SCHEDULED" | |
| MAIL READING MODE "SCHEDULED AND REMOTE MODE" | |
| SCHEDULED READING INTERVALS "30 MIN" | |
| ⋮ | DESIGNATION OF REMOTE ACCESSING OPERATION |
| NUMBER OF FACSIMILE DESTINATIONS "2" | DESIGNATION OF FACSIMILE TRANSMISSION |
| FACSIMILE DESTINATION [1] "093-333-4444" | |
| FACSIMILE DESTINATION [2] "093-444-555" | |

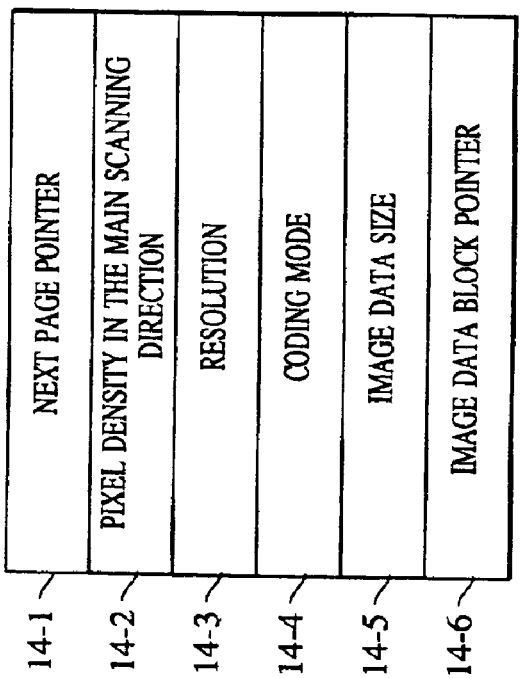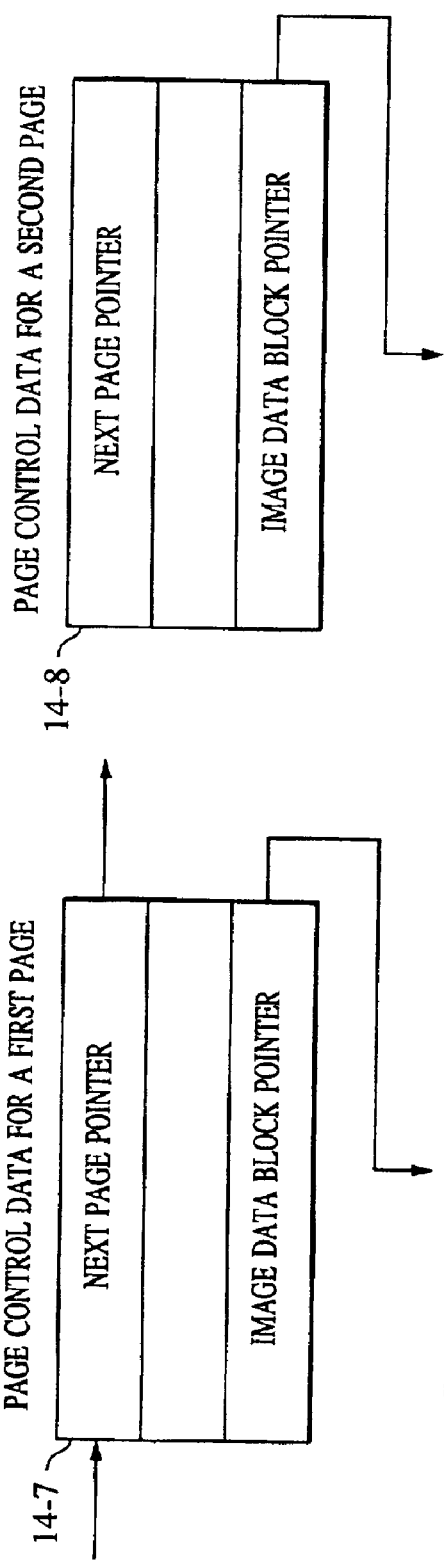
FIG. 14

COMMUNICATION DEVICE HAVING THE CAPABILITY OF PERFORMING INFORMATION EXCHANGE BETWEEN A FACSIMILE MEDIUM AND AN ELECTRONIC INFORMATION MEDIUM SUCH AS AN E-MAIL MEDIUM

This application is a division of application Ser. No. 09/112,318, filed on Jul. 9, 1998.

BACKGROUND OF THE INVENTION

1. Field of the Invention

The present invention relates to a communications device capable of exchanging information between a facsimile medium and an electronic information medium such as an electronic mail medium.

2. Description of the Related Art

In addition to information exchange using a facsimile machine or a telephone device over a telephone line, exchange of electronic information in the form of electronic mail (e-mail) or the like through the Internet has become popular in recent years. E-mails have the capability of transferring various types of information such as images, voices, computer data, etc., as well as textual information. In companies, e-mails are usually used in such a manner that individual users of e-mails receive e-mails via their post office (also called a mail box) provided in an e-mail server installed in each company. E-mails sent to individuals are first temporarily stored in their post office. The individuals may get and read e-mails addressed to them by getting access to the e-mail server directly or via a LAN or the Internet using personal computers provided in the company. Such an access is performed by e-mail client software running on the personal computers. Although it is also possible to get access to a post office from outside of the company via a telephone line or the Internet, such an access has the risk that confidential information is exposed to the outside.

To prevent such a risk, most companies do not allow access to post offices from the outside of the companies. In even those companies that allow access to post offices from the outside, e-mails are encrypted or access is limited to that which is performed directly via a telephone line without using the Internet. Even in such a case, access is allowed only via a special access server which accepts only a special throwaway password which is changed after completion of each access.

However, this technique has the following problems.

1. To establish a system which allows individuals to read e-mails from the outside, it is required to make modifications over the whole electronic information system in the company. Thus such a system is expensive not only in the initial installation but also in maintenance.

More specifically, to establish an e-mail system which allows individuals to get access to the system from the outside to read e-mails, it is required, as described above, to install a system capable of encrypting e-mails or install an access server dedicated to use for access via a telephone line from the outside.

However, such a system needs hardware and software which are expensive not only in the initial installation but also in maintenance.

The introduction of software for enciphering e-mails requires not only modification of software of the e-mail server of the company but also modification of e-mail client software running on all personal computers of e-mail users in the company.

To get access to the system from the outside to read e-mails, it is required that users carry a portable personal computer or a portable data terminal with software for reading electronic information by means of remote access to the system located inside the company. It is rather popular that salespeople carry their portable personal computer or portable data terminal outside of their company. In this case there is no serious problem because portable terminals are used within the normal working hours and salespeople can easily get electronic information such as e-mail data from the outside. This makes it possible for salespeople to quickly and timely provide required information to customers and thus make a greater profit.

It is also desirable that companies have a system which allows people working in the research-and-development division of the company to get access to the internal system from the outside so as to obtain some information useful in doing a creative job such as development of new products. However, companies are not willing to establish such a system because the introduction of the system needs a large investment while the access to the system by researchers and engineers does not bring about a quick profit.

2. In the case of companies which do not allow access to e-mails from the outside, the only way of getting an e-mail from the outside is to obtain it via someone in the company.

For example, when one wants to get information described in e-mails sent to him/her, one possible way is to make a phone call to someone in the company and ask him/her to report the contents of e-mails or to manually send e-mails. If one wants to get information on company holiday, it is required that he/she come to the company.

SUMMARY OF THE INVENTION

In view of the above, it is an object of the present invention to provide an improved communication device.

More specifically, it is an object of the present invention to provide a communication device which allows a user to get access from the outside via an external public communication line so as to read an e-mail, which has excellent security and which can be easily installed.

It is another object of the present invention to provide a communication device which allows a facsimile machine connected to a public switched telephone network to serve as an e-mail client connected to a computer network.

It is still another object of the present invention to provide a communication device capable of transferring e-mail data, in response to a remote operation command, from an e-mail server connected to a computer network to a specified arbitrary destination connected to a public switched telephone network.

It is still another object of the present invention to provide a communication device having the capability of informing a user whether there is some new e-mail or no e-mail in a specified post office of an e-mail server, when the user issues a remote operation command to get e-mail data by means of facsimile via the public line.

It is still another object of the present invention to provide a communication device which allows a user to either delete or maintain e-mail data after reading it by means of remote access via a public switched telephone network, by issuing a selection command via the public switched telephone network, and which is thus convenient to use.

These and other objects and features of the present invention will become more apparent from the following detailed description of preferred embodiments as illustrated in the accompanying drawings.

BRIEF DESCRIPTION OF THE DRAWINGS

FIG. 4 illustrating an example of e-mail data output;

FIG. 5 illustrating another example of e-mail data output;

FIG. 7 illustrating still another example of e-mail data output;

FIG. 8 illustrating still another example of e-mail data output;

FIG. 12 is a schematic representation of management data for managing information exchange between facsimile and e-mail;

FIG. 14 is a schematic illustration of page management data.

DESCRIPTION OF THE PREFERRED EMBODIMENT

The present invention is described in further detail below with reference to a preferred embodiment in connection with the accompanying drawings.

In the following description, a facsimile device having the capability of performing format conversion between e-mail and facsimile is taken as an example of a communication device according to the present embodiment.

Figure 1:
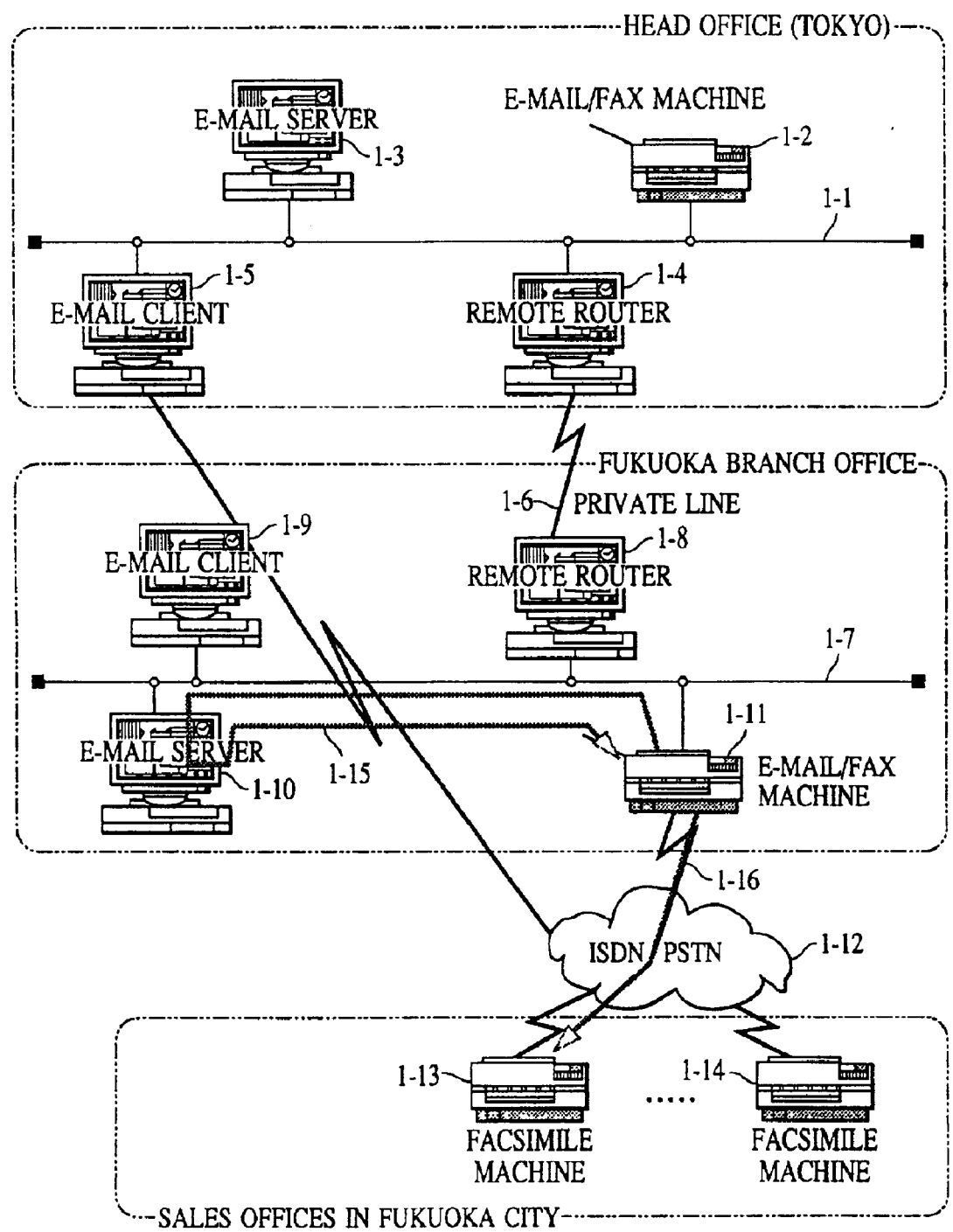
FIG. 1 is a schematic diagram illustrating an e-mail/facsimile machine connected to other devices via a network.

FIG. 1 illustrates a facsimile machine 1-11 having the capability of performing format conversion between e-mail and facsimile (hereinafter such a type of facsimile machine will be referred to simply as an e-mail/facsimile machine) according to the present embodiment of the invention wherein the e-mail/facsimile device 1-11 is connected to other devices via a network.

In a first head office (in Tokyo), as shown in FIG. 1, there are provided an e-mail/facsimile machine 1-1 according to the present embodiment, a facsimile machine 1-2, an e-mail server 1-10, an e-mail server 1-3, an e-mail client personal computer 1-5, and a remote router 1-4 for realizing a LAN-connection to a branch office (in Fukuoka) via a private line 1-6, which are all connected to a LAN 1-1.

In the Fukuoka branch office, there are provided a remote router 1-8 for realizing a LAN-connection to the Tokyo head office, an e-mail/facsimile machine 1-11 according to the present embodiment, an e-mail server 1-10, and an e-mail client personal computer 1-9, which are all connected to a LAN 1-7. The e-mail/facsimile machine 1-11 according to the present embodiment is also connected to a PSTN (public switched telephone network) or an ISDN (integrated service digital network) so as to communicate with facsimile machines 1-13 and 1-14 provided in sales offices in Fukuoka city.

Figure 11:
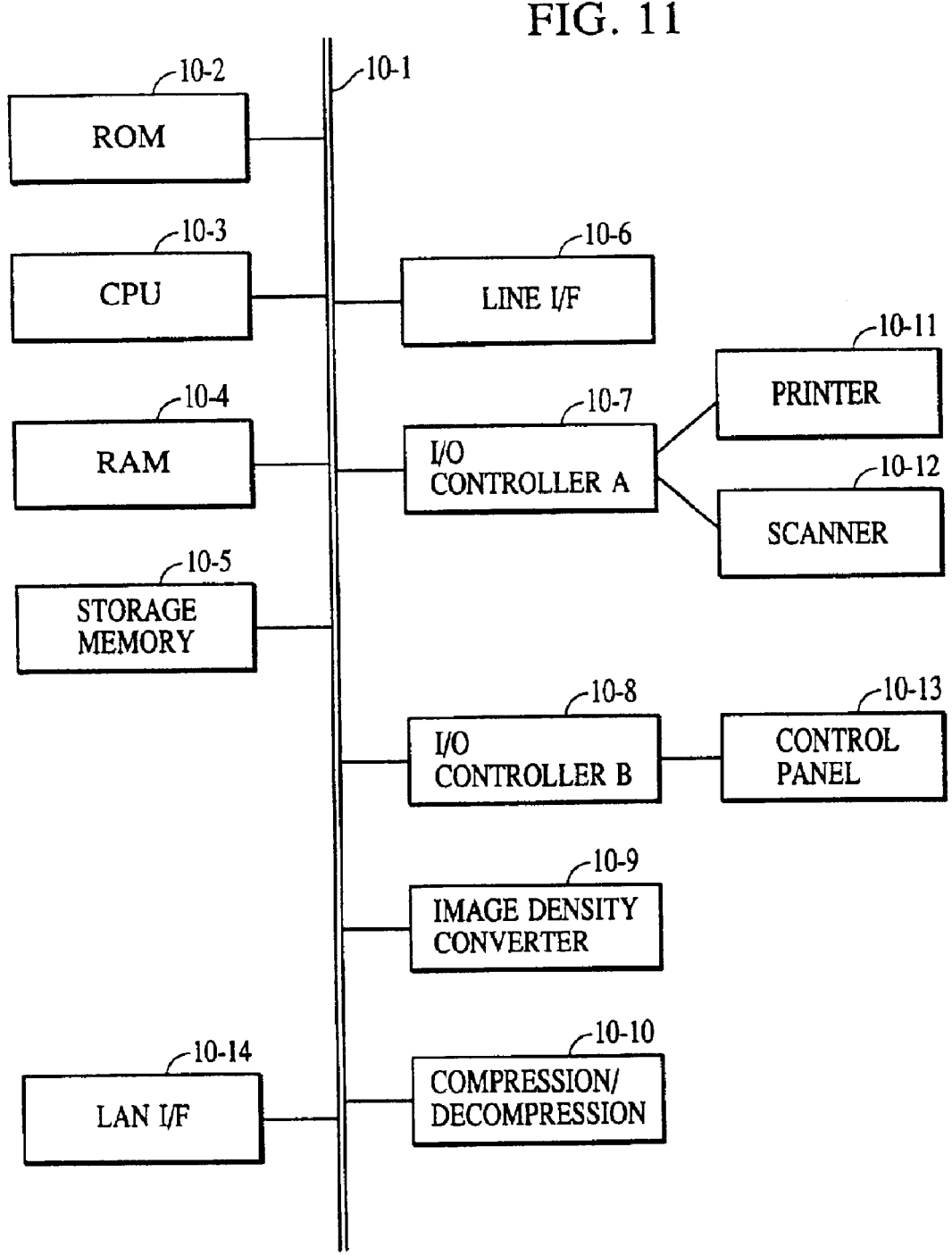
FIG. 11 is a block diagram illustrating the construction of the e-mail/facsimile machine.

FIG. 11 is a block diagram illustrating the construction of the e-mail/facsimile machine according to the present embodiment of the invention.

In the e-mail/facsimile machine shown in FIG. 11, a ROM (read only memory) 10-2 stores a computer program (software) which is executed by a CPU 10-3 to control the operation over the whole machine.

Figure 3:
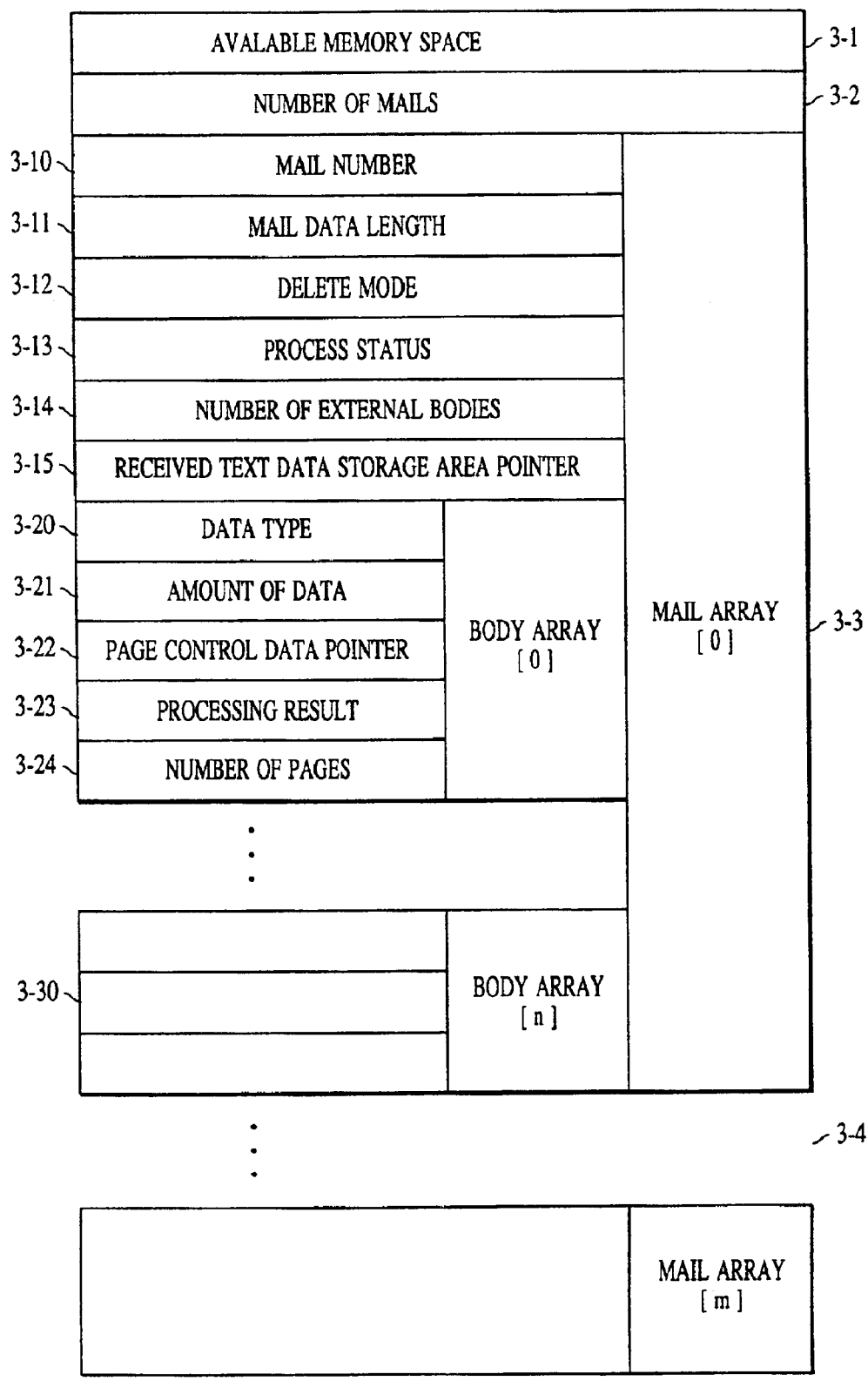
FIG. 3 is a schematic illustration of management data for managing e-mail data.

A RAM (random access memory) 10-4 is used to store various data required in controlling the operation and also store management data such as that shown in FIG. 3. A storage memory 10-5 stores e-mail data and also coded data used in facsimile communication.

A line I/F (interface) 10-6 includes a CCU (communication control unit), a modem, and an NCU (network control unit) and performs, under the control of the CPU 10-3, a communication operation such as a calling operation over a communication line such as an ISDN line or a PSTN line.

Under the control of the CPU 10-3, an I/O controller 10-7 controls the printing operation performed by a printer 10-11 and the operation of scanning and transferring an image performed by a scanner 10-12.

Under the control of the CPU 10-3, an I/O controller 10-8 controls a control panel 10-13 including a display device and various keys, so that key input information given via keys is transferred and various information is displayed on the display device. The control panel also includes a special key used to get access to the e-mail server (e-mail server access key).

An image density converter 10-9 performs conversion in terms of the image data resolution, the page size, and the mm/inch conversion.

A compression/decompression unit 10-10 encodes image data obtained via the scanner 10-12 (into MH MR, or MMR codes) and decodes received data.

A LAN I/F 10-14 is an interface for making a connection to the LAN and further to the Internet via a device such as a remote router.

In the present embodiment of the invention, bitmap data used to convert e-mail data to image data, that is, data used to convert textual data to bitmap image data is stored in the ROM 10-2.

The construction of the e-mail/facsimile machine according to the present embodiment has been described above.

Referring now to FIG. 12, e-mail/facsimile information management data is described below. According to this e-mail/facsimile information management data (hereinafter also referred to simply as management data), the e-mail/facsimile machine 1-11 gets access to e-mails and performs conversion between facsimile image data and e-mail text data. The e-mail/facsimile information management data is stored in the RAM 10-4, and is referred to by the CPU 10-3 during the operation of getting access to an e-mail and performing conversion between facsimile image data and e-mail text data according to the program stored in the ROM 10-2.

In the e-mail/facsimile information management data shown in FIG. 12, e-mail server IP address "192.33.22.11" is the address assigned to the e-mail server 1-10.

In this embodiment, the e-mail/facsimile machine 1-11 can get e-mails from any of 10 post offices by accessing the e-mail server 1-10, wherein the number of post offices is stored the field "NUMBER OF POST OFFICES" 11-2 of the management data.

When the e-mail/facsimile machine 1-11 receives a remote operation command requesting to read an e-mail, from the outside via the PSTN or the ISDN, the CPU 10-3 searches 10 user ID data (11-7 and similar data stored in post office arrays 11-30 to 11-40) included in the management data so as to determine whether some of these ID data are coincident with the user ID data of the user who has issued the e-mail reading request. If coincidence is found in the user ID data, the CPU 10-3 further determines whether the password of the user who has issued the remote control command is equal to the password stored in the password data element 11-8 of the corresponding post office array 11-20 (in the post office arrays 11-20 to 11-40). If the password is valid, then CPU 10-3 determines whether the remote operation command includes data specifying the destination of facsimile transmission. If the destination is specified by the remote control command, then the data specifying the destination is stored in the field "ONLINE-SPECIFIED FACSIMILE DESTINATION" 11-11 of the corresponding post office array 11-20 (of the post office arrays 11-20 to 11-40). Then polling to the corresponding post office is performed.

Figure 2A:
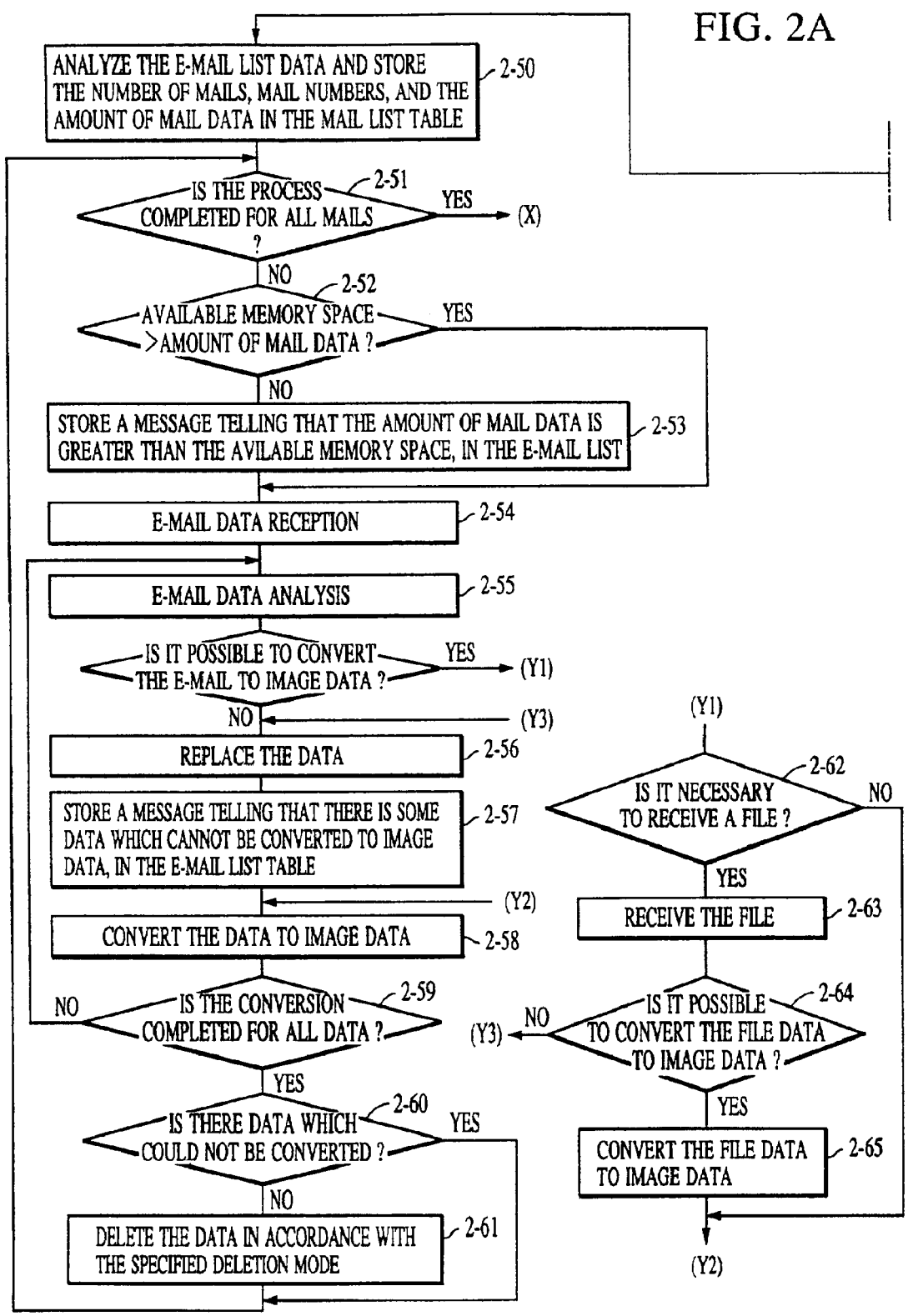
FIG. 2, which consists of FIGS. 2A and 2B, illustrates a communication sequence and communication process performed by an e-mail/facsimile machine according to an embodiment of the invention.

The polling is performed, as shown in FIG. 2, in accordance with the POP-3 standard (Post Office Protocol Ver. 3 recommended by IETF (Internet Engineering Task Force)).

The management data shown in FIG. 12 includes post office information 11-20, 11-30, . . . , 11-40 associated with 10 post offices, respectively. The contents of each post office information include "POST OFFICE NAME" 11-3 identifying a particular post office, "FACSIMILE/E-MAIL CONVERTING OPERATION MODE" 11-4 indicating whether polling is performed either in a scheduled polling mode or in a remote polling mode, "MAIL READING MODE" 11-5 specifying the contents of data to be transferred by facsimile after an e-mail is transferred in the scheduled polling mode, "SCHEDULED READING INTERVALS" 11-6 specifying the time intervals at which scheduled reading is performed, "NUMBER OF FACSIMILE DESTINATIONS" 11-12 indicating the number of destinations to which facsimile image data produced by means of conversion from e-mail data obtained from post offices are transferred, and "FACSIMILE DESTINATION" 11-13 indicating the telephone number of the facsimile destination.

The destinations of the facsimile transmission in the scheduled polling mode may also be determined from the phone numbers indicating the facsimile destinations described in the e-mail data gotten from the e-mail server. When the destination is described in the e-mail data gotten from the e-mail server, the destination described in the e-mail data is employed as the facsimile destination in precedence to the data described in "FACSIMILE DESTINATION" 11-13. That is, communication is performed to the destination specified by the description in the e-mail data.

Figure 13:
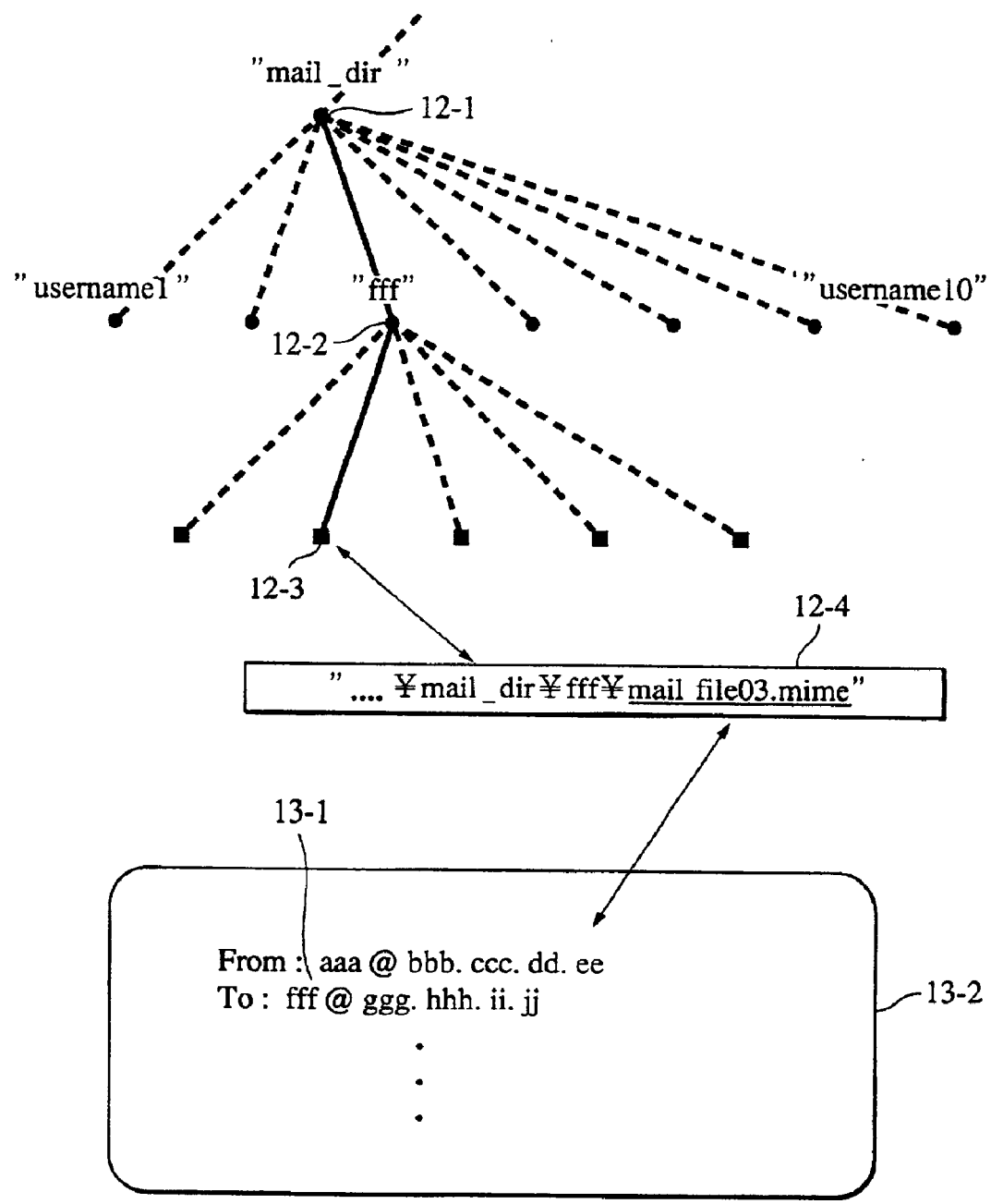
FIG. 13 is a schematic diagram illustrating the directory structure of an auxiliary storage device of an e-mail server 1-10.

FIG. 13 illustrates the directory structure of an auxiliary storage device of the e-mail server 1-10.

In the e-mail server, post offices are produced in subdirectories of a directory "mail-dir" 12-1. A directory "fff" 12-2 is assigned to a post office used to transfer e-mails, after converting them to facsimile data, to the facsimile machine 1-13 in the Fukuoka branch office.

The post office "fff" corresponds in an one-to-one fashion to the post office data 11-10. When the e-mail/facsimile machine 1-11 gets access to the post office "fff" to obtain e-mail data, the e-mail/facsimile machine 1-11 refers to the post office name "fff" 11-11 of the post office data 11-10, and sends this data "fff" as the parameter "MAIL USER NAME" 2-3 defined in the protocol POP-3 (FIG. 2) to the e-mail server.

In FIG. 13, there is shown data 13-2 which is a part of the contents of an e-mail file "mail file003.mime" which was transmitted by the personal computer 1-5 to the address "fff@ggg.hhh.ii.jj" 13-1 and which is now stored in the directory "fff" of the e-mail server 1-10. This file is a text file described in accordance with MIME (Multiple-purpose Internet Mail Extensions recommenced as an e-mail data format by IETF). "ggg.hhh.ii.jj" of "fff@ggg.hhh.ii.jj" indicates that the e-mail server 1-10 is designated as the destination of the e-mail, and the user name "fff" designates a particular post office.

FIG. 14 illustrates page management data for controlling facsimile image data page by page.

In FIG. 14, a data field NEXT PAGE POINTER 14-1 includes data pointing to a next page following a current page.

A data field NUMBER OF PELS ALONG THE MAIN SCANNING DIRECTION 14-2 represents the number of pels along the main scanning direction, wherein A4 image data with a standard resolution includes 1728 dots (pels).

A data field RESOLUTION 14-3 includes data indicating the resolution of the image data. In the case of a A4 standard size, the image has a resolution of 8 pels/mm×3.85 pels/mm.

A data field CODING MODE 14-4 includes data indicating the coding mode. The MH (modified Huffman) coding scheme is required herein.

A data field IMAGE DATA SIZE 14-5 includes data representing the image data size in bytes.

A data field IMAGE DATA BLOCK POINTER 14-6 includes data pointing to the first address of an image data block chain of the storage memory 10-5 in which the facsimile data is stored.

In FIG. 14, there are shown page management data 14-7 associated with a first page and also page management data 14-8 associated with a second page, wherein facsimile image data obtained by means of conversion from the e-mail data shown in FIG. 4 is managed page by page by these page management data. In this specific example, the first page corresponds to the image data shown in FIG. 5, and the second page corresponds to the image data shown in FIG. 6.

The flow of information from the personal computer 1-5 to a Fukuoka sales office is described below.

An e-mail to a Fukuoka sales office, produced by the personal computer 1-5, is transferred to the e-mail server 1-10 as follows. The e-mail is transferred, according to the e-mail transfer protocol SMTP (Simple Mail Transfer Protocol recommended by IETF), via the remote router 1-4 and further via the private line 1-6, to the post office "fff" 12-2 provided in the storage device of the e-mail server 1-10 at the Fukuoka branch office wherein the post office "fff" 12-2 is used to distribute e-mails to sales offices in Fukuoka city. After that, the e-mail/facsimile machine 1-11 gets the e-mail from the above post office as indicated by an arrow 1-15. The e-mail/facsimile machine 1-11 converts the e-mail data to image data. The e-mail/facsimile machine 1-11 then makes a call to the facsimile destination "093-222-333" and sends the resultant image data to a facsimile machine 1-13 as indicated by an arrow 1-16. The facsimile transmission is performed in accordance with the facsimile communication protocol T.30 recommended by ITU-T.

FIG. 2 illustrates the process performed by the e-mail/facsimile machine 1-11 to get e-mail data from the e-mail server 1-10 and then convert it to image data. The control program for the above process is stored in the ROM 10-2 and is executed by the CPU 10-3.

Referring to FIG. 2, the operation of the e-mail/facsimile machine is described below.

In the communication sequence shown in FIG. 2, it is assumed that three e-mails are received wherein the first e-mail is received correctly with no errors, the second e-mail data is invalid (incapable of being interpreted), and the third e-mail includes too much data and thus only the header is extracted from the third e-mail data. The flow chart on the left side of FIG. 2 illustrates a process from step 2-5 in which a list of e-mail data is received to step 2-13 in which an e-mail service termination request is issued.

To communicate with the e-mail server 1-10, the CPU 10-3 of the e-mail/facsimile machine 1-11 extracts the IP address "192.33.22.11" assigned to the e-mail server 1-10, from the data field E-MAIL SERVER IP ADDRESS 11-1 of the management data (shown in FIG. 12) stored in the RAM 10-4. The CPU 10-3 then establishes a TCP link via a port number POP-3 according to the TCP protocol thereby establishing a connection to the e-mail server 1-10. After establishing the connection, a procedure (a sequence of processing steps including checking whether the server is available for service, user authentication, and checking whether there is some e-mail to the user) 2-3 is performed by the line I/F 10-6 or the LAN I/F 10-14 under the control of the CPU 10-3. The CPU 10-3 then extracts a character string "fff" as a user identification parameter from the data field POST OFFICE NAME 11-11 corresponding to the post office "fff" of the e-mail server 1-10, and thus identifies the user. The procedure 2-3 is similar to that performed by the e-mail client 1-5, and thus it is not described in further detail here. Thus the communication link is established between the e-mail/facsimile machine and the e-mail server. It is assumed here that the storage memory 10-5 has an available memory space of 300 Kbytes (refer to the management data shown in FIG. 3) at this stage of the process.

In the following communication sequence, the CPU 10-3 of the e-mail/facsimile machine 1-11 sends an e-mail list transmission request to the e-mail server 1-10 via the line I/F 10-6 and the LAN I/F 10-14 (in step 2-4). Thus, the CPU 10-3 receives e-mail list data from the e-mail server 1-10 (step 2-5). The CPU 10-3 of the e-mail/facsimile machine 1-11 analyzes the contents of the e-mail list data received, and puts 3 into the data field NUMBER OF MAILS 3-2 of the management data shown n FIG. 3. Furthermore, the CPU 10-3 puts 1, 2, and 3 into the data fields MAIL NUMBER and puts amounts of data the respective e-mails into the data fields MAIL DATA AMOUNT. For example, the e-mail data amounts of the first, second, and third e-mails are 1 Kbytes (with 30 Kbytes of facsimile image data), 2 Kbytes (with 40 Kbytes of color image data), and 500 Kbytes, respectively, and these values are put in the corresponding data fields MAIL DATA AMOUNT of mail_array[0], mail_array[1], and mail_array[2], respectively (step 2-50).

Now the process on the first e-mail data (including both text data and image data as shown in FIG. 4) is described below. The CPU 10-3 determines whether the process is completed for all e-mails (step in 2-51). In this specific example, the process is not completed yet for all e-mails, and thus the CPU 10-3 determines whether the available memory space (which is indicated by the data field AVAILABLE MEMORY SPACE 3-1 of the management data shown in FIG. 3, and which is equal to 300 Kbytes in this case) is sufficient compared to the data amount of the first e-mail (which is indicated by the data field MAIL DATA AMOUNT of mail_array[0] of the management data shown in FIG. 3 and which is equal to 1 Kbyte in this case). In this specific example, because the available memory space is sufficient, the program goes to step 2-54 to perform an e-mail data reception process. In the e-mail data reception process, the CPU 10-3 issues an e-mail data transmission request to the e-mail server 1-10 (step in 2-6). In response, the e-mail server 1-10 sends e-mail data 1 to the e-mail/facsimile machine 1-11 (step in 2-7). The CPU 10-3 puts 1 into the data field NUMBER OF EXTERNAL BODIES 3-14 in the e-mail list table (in FIG. 3) and puts "TEXT" into the data field DATA TYPE 3-20 of body_array[0]. The CPU 10-3 allocates 1 Kbyte for the first e-mail data by putting 1 Kbyte into the data field AMOUNT OF DATA 3-21. Furthermore, the CPU 10-3 puts the corresponding address of the allocated memory area into the data field RECEIVED TEXT DATA STORAGE AREA POINTER 3-15 and stores the received e-mail data 1 (text data) into the storage memory.

The received data includes a header and a body. In the specific example shown in FIG. 4, The header starts at the top line "From: aaa.bbb.ccc.dd.ee" and ends at a line saying "Message-Id: <19960704215959.TAA99999@xxx.ccc.dd.ee>" The body starts at a line including first "---Boundary---" and ends at a line including third "---Boundary---". The body is divided at a line including second "---Boundary---" into two parts: body 1 and body 2.

Figure 6:
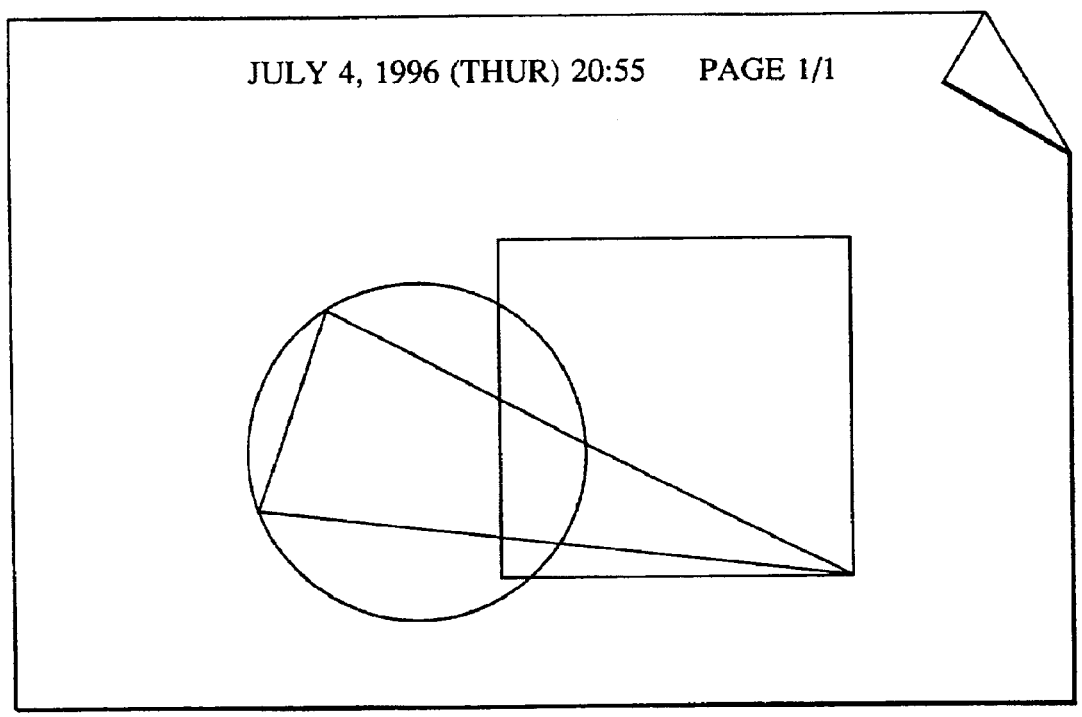
FIG. 6 illustrating still/another example of e-mail data output.

In this case, NUMBER OF EXTERNAL BODIES 3-14 is eventually set as 2. The body 1 and body 2 include different data. More specifically, the body 1 includes data of the type of Japanese text data as indicated by "Content-type: Text/Plain; charset=iso-2022-jp". The header and the body 1 are converted to text data as shown in FIG. 5. On the other hand, the body 2 includes an external file data defined by the following representation:

Content-type: message/external-body; access-type= ANON-FTP;

site="aaa.bbb.cc.dd"; directory="fax"

name="file19960704215959.xxx"

content-type: image/iff where "content-type: image/iff" is an identifier indicating the type of the content (image data file in this specific example). FIG. 6 illustrates a specific example of facsimile image data included in the body 2, wherein the image data has a resolution of 8×3.85 ppm with 1728 dots along the main scanning direction and is coded according to the MH (modified Huffman) coding technique.

The CPU 10-3 then proceeds to an e-mail data analysis step (step 2-55) so as to analyze the body 1 of the e-mail data 1.

The description "boundary="---Boundary---"" indicates that the bodies are separated by separator "---Boundary---". "Content-type: Text/Plain; charset=iso-2022-jp" indicates that the type of the data is text. Because this text data can be converted to image data, the program goes to step 2-62 and puts "OK" into the data field PROCESSING RESULT 3-23 of body_array[0]. The CPU 10-3 determines whether it is required to receive a file (in step 2-62). In this specific example, the body 1 of the e-mail data 1 does not need reception of a file, and thus the program goes to step 2-58 to perform an image conversion process.

In the image conversion process in step 2-58, the CPU 10-3 puts "Text/Plain; charset=iso-2022-jp" into the data field DATA TYPE 3-20. The CPU 10-3 then allocates a particular memory area to a page management data, and puts the address of the allocated memory area into the data field PAGE MANAGEMENT DATA POINTER 3-22. Furthermore, the CPU 10-3 generates text data such as that shown in FIG. 5 on the basis of the text data of the header and the text data from the line immediately after the line "Content-type: Text/Plain; charset=iso-2022-jp" to the line immediately before "---Boundary---". This text data is then converted to bitmap image data having a resolution of 8 pels/mm×3.85 pels/mm and including 1728 dots along the main scanning direction, by referring to the character bitmaps stored in the ROM 10-2. The bit image data is then applied to the compression/decompression unit 10-10 and converted to MH-coded facsimile image data. In the above process, image data blocks are allocated in a particular memory area, and the image data is stored in the allocated image data blocks. Furthermore, the CPU 10-3 puts the respective values described above into the data fields NUMBER OF PELS ALONG THE MAIN SCANNING DIRECTION 14-2, RESOLUTION 14-3, CODING MODE 14-4 of the page management record. Furthermore, the CPU 10-3 puts the image data in the location following the image data block cue specified by IMAGE DATA BLOCK POINTER 14-6. The value of IMAGE DATA SIZE 14-5 is increased by 8 bytes each time image data is stored in an image data block. In this way, the text data is converted to image data and the resultant image data is stored in the memory area of the storage memory 10-5 allocated for the image data blocks. After completion of the conversion to image data, the program goes to step 2-59.

In step 2-59, the CPU 10-3 determines whether the process is competed for all parts of the data. In this case, the process is not completed for all parts, and thus the program goes to step 2-55 to perform an e-mail data analysis on the body 2 of the e-mail data 1 shown in FIG. 4.

In the analysis of the body 2, it is determined from the description "Content-type: image/iff" that the body 2 is image data. Furthermore, from the description:

Content-type: message/external-body; access-type=ANON-FTP;
site="aaa.bbb.cc.dd"; directory="fax"
name="file19960704215959.xxx"

it is determined that the corresponding data is an external file "massage/external-body" which should be transferred from a file with a file name "file19960704215959.xxx" in a directly "fax" of an auxiliary storage device of a computer having a host name "aaa" in a domain "bbb.cc.dd" wherein the file is transferred according to the anonymous FTP (file transfer protocol), as indicated by the description "access-type=ANON-FTP".

Thus, the CPU 10-3 determines in step 2-62 that reception of the file is required, and receives the file. The received file is stored in the RAM 10-4 (in step 2-63).

The CPU 10-3 detects that the file received in step 2-63 includes MH-coded facsimile image data having a resolution of 8×3.85 ppm and including 1728 dots along the main scanning direction such as that shown in FIG. 6, and thus determines that the received file can be converted into the form of image data (step 2-64). Thus, the CPU 10-3 converts the received file to image data (step 2-65).

In the process of step 2-65, the CPU 10-3 allocates a particular memory area for the page management data, and puts the above data representing the resolution and other characteristics into the page management data. Furthermore, the CPU 10-3 allocates a particular memory area of the storage memory 10-5 for image data blocks and stores the facsimile image data extracted from the received file data into the image data blocks allocated in the storage memory 10-5. During the above process, the CPU 10-3 creates an image data block cue and puts it in IMAGE DATA BLOCK POINTER and puts data representing "OK" in PROCESSING RESULT of body_array[1] shown in FIG. 3.

Then in step 2-60, the CPU 10-3 determines whether there is data which cannot be interpreted or cannot be decoded. In this specific example, the body 2 of the e-mail data 1 has been successfully decoded into the form of facsimile image data, and thus the CPU 10-3 determines that there is no such data and proceeds to step 3-12. In step 3-12, the CPU 10-3 puts "delete requested" in DELETE MODE 3-12, so that a data delete request associated with the e-mail data 1 is sent to the e-mail server 1-10 in step 2-8. On reception of the e-mail data delete request, the e-mail server 1-10 deletes the e-mail data 1.

In an incoming call reception process which will be described later with reference to FIGS. 9 and 10, if the e-mail reading mode is specified by a remote operation command, then the CPU 10-3 gets e-mail data in the specified reading mode (either whole data reading mode or header-only reading mode) and sets the data field DELETE MODE 3-12 depending on the specified reading mode.

The process for the second e-mail (an external file which cannot be interpreted as text data) is described below. Before the text analysis step, the process is performed in the same manner as for the e-mail data 1, and thus the description starts from the text analysis step.

In the analysis of the e-mail data (in step 2-55) the CPU 10-3 determines that it is required to process a color image data file. However the e-mail/facsimile machine does not have the capability of dealing with color image data, and the CPU 10-3 sets the data field PROCESS STATUS of mail_array[1] of the management data shown in FIG. 3 so as to indicate that the data includes color image data which cannot be dealt with. Furthermore, the CPU 10-3 inserts alternative information including a character string "The color image data listed below is also received but this machine is not capable of dealing with it.", as shown in FIG. 7, into the text data which has been received and is now stored in a memory area pointed to by DATA AREA POINTER stored in body_array[1] of mail_array[1]. The CPU 10-3 puts data, indicating that there is data incapable of being interpreted, into the data field PROCESSING RESULT of body_array[0] of mail_array[1] and also into PROCESS STATUS of mail_array[0]. Furthermore, the CPU 10-3 puts data "don't delete" in DELETE MODE (steps 2-56 and 2-57), and decodes the data into image data (step 2-58).

Then in step 2-59, the CPU 10-3 determines that there are no more parts which should be processed, and thus the CPU 10-3 proceeds to step 2-60 and further to step 2-61. The CPU 10-3 returns the program to step 2-51 without transmitting a "data delete request" associated with the e-mail data 2 to the e-mail server 1-10, because "don't delete" is stored in DELETE MODE.

FIG. 7 illustrates the contents of the e-mail data 2 decoded into the form of image data.

The process for the third e-mail (including facsimile image data which is too large to receive) is now described below.

In this case, the CPU 10-3 checks the available memory space in step 2-51 and determines that it is impossible to receive all e-mail data because the e-mail data to be received includes 500 Kbytes although the currently available memory space is 227 Kbytes. Thus, the CPU 10-3 receives only the header (for example the part of the text data ending at the line "---Boundary---" shown in FIG. 4) of the e-mail, and puts data "memory overflow error" into PROCESS STATUS of mail_array[2] (step in 2-53). After that, the CPU 10-3 puts data "memory overflow error" also into PROCESSING RESULT of body_array[0] of mail_array [2] and furthermore into PROCESS STATUS of mail_array [2]. The CPU 10-3 then puts data "don't delete" into DELETE MODE. Subsequently, the CPU 10-3 inserts a message telling "The data cannot be received because the memory does not have enough available space" into the text data of the received e-mail (steps 2-56 and 2-57). The CPU 10-3 then converts the text data of the received e-mail into the form of image data (step 2-58). Because DELETE MODE is "don't delete", the CPU 10-3 does not send a delete request associated with the e-mail data 3 to the e-mail server 1-10 (in step 2-60).

If the process has been completed for all e-mail data, the CPU 10-3 of the e-mail/facsimile machine sends an e-mail data service termination request to the e-mail server 1-10. If an ACK signal is received from the e-mail server 1-10, the CPU 10-3 releases the link, and thus the process is entirely completed (in step 2-13).

In the above process, the data delete request may be sent to the e-mail server 1-10 either at the time when the e-mail data is received, at the time when the e-mail data has been converted into the form of facsimile image data, or at the time when the facsimile image data has been correctly printed, in accordance with the setting made by a user.

In the e-mail/facsimile machine 1-11 according to the present embodiment of the invention, the printer 10-11 has the capability of recording (printing) image data created via the conversion process. Furthermore, the e-mail/facsimile machine 1-11 has the capability of converting the e-mail list shown in FIG. 8 to image data by referring to the e-mail list data shown in FIG. 3, and printing the resultant image data using the printer 10-11 or transmitting an external facsimile machine in response to a remote operation command.

Referring now to the flow charts shown in FIGS. 9 and 10, various operations performed by the e-mail/facsimile machine 1-11 on the e-mail data obtained by getting access to the e-mail server 1-10 are described below.

Figure 9B:
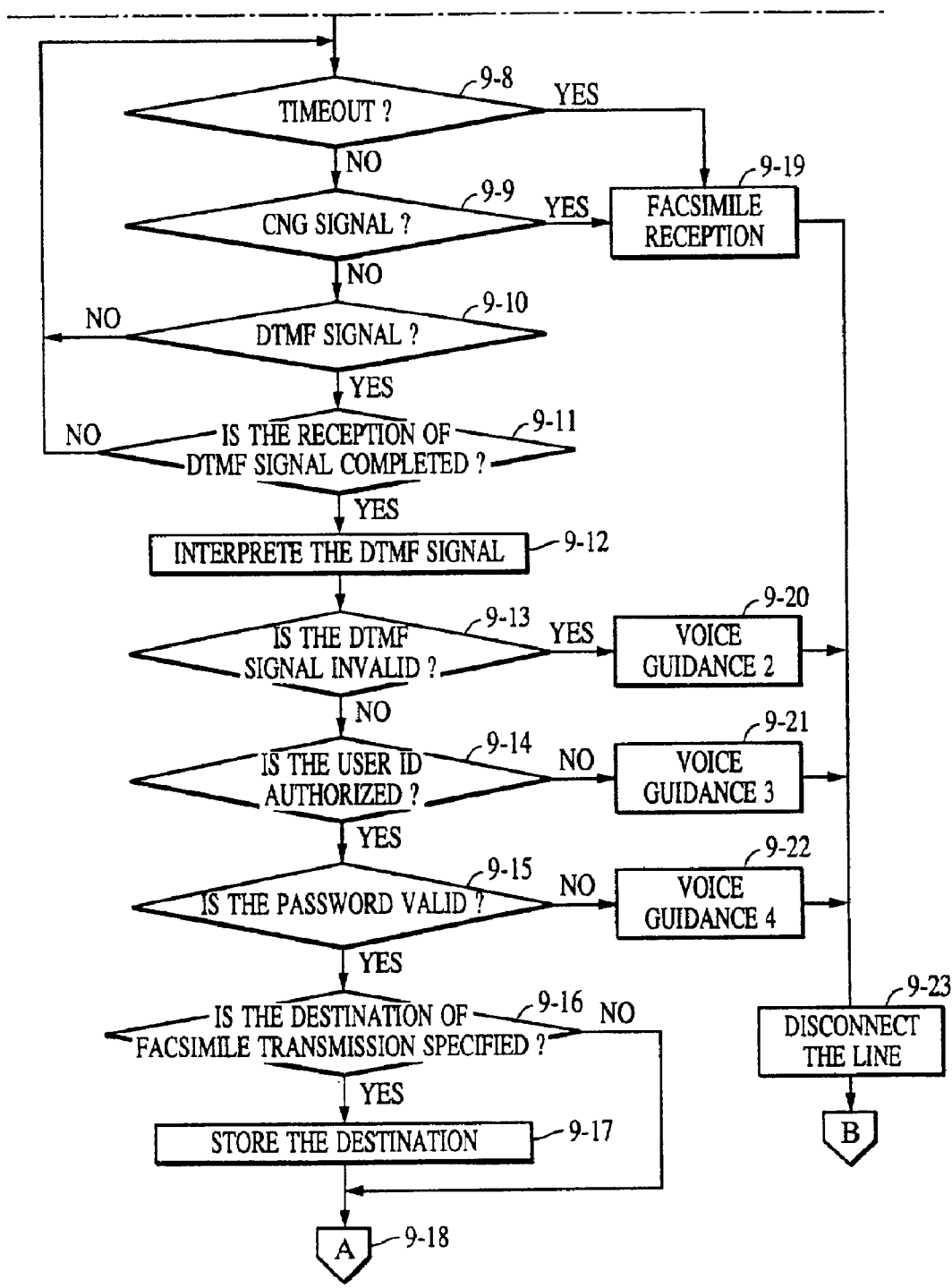
FIG. 9 which consists of FIGS. 9A and 9B, is a flow chart illustrating a process performed by the e-mail/facsimile machine in response to an incoming call.
Figure 10:
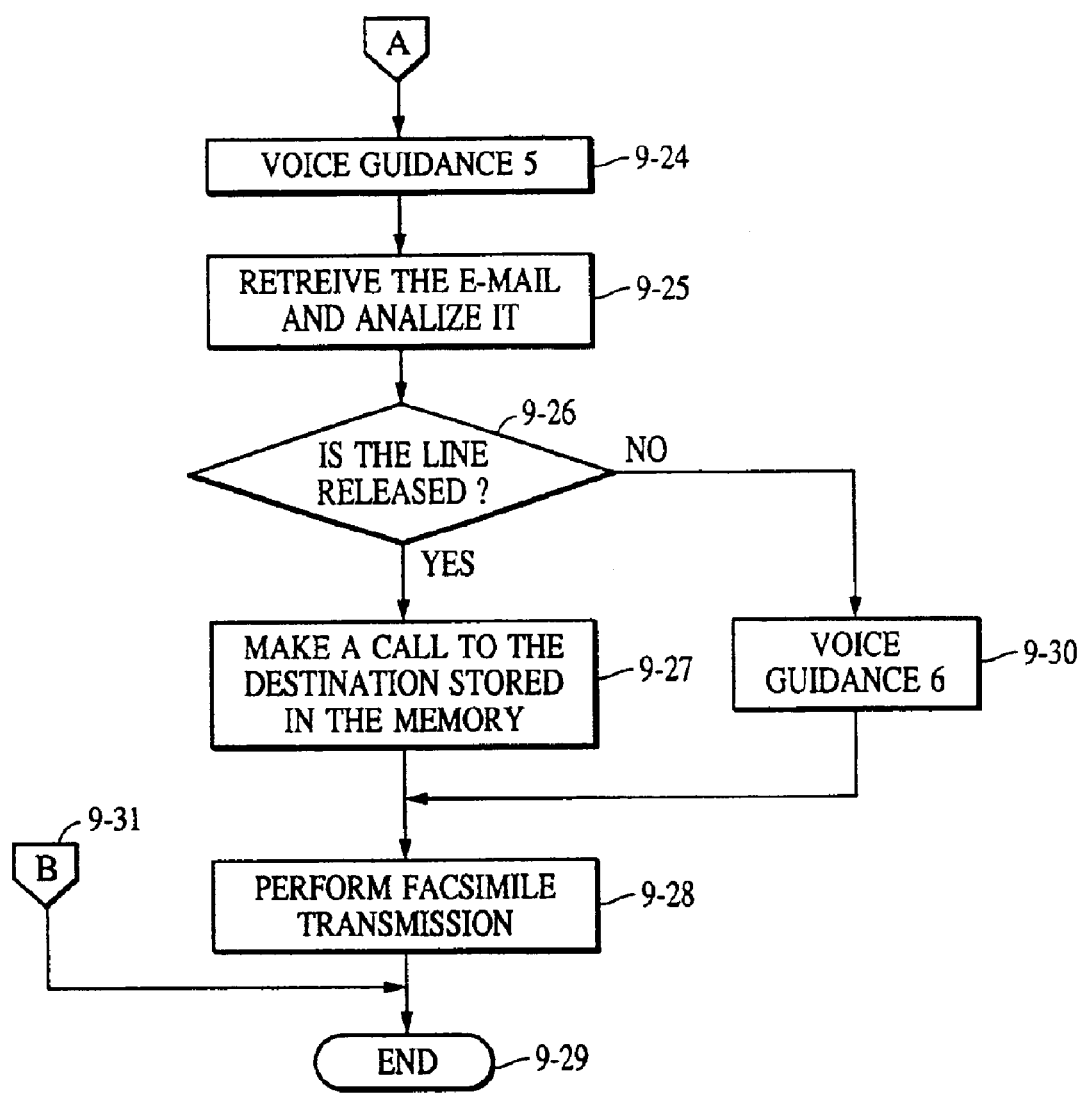
FIG. 10 is a flow chart illustrating a process performed by the e-mail/facsimile machine in response to an incoming call.

Before describing the operation shown in the flow charts in FIGS. 9 and 10, the format of data associated with the remote operation command is first described. This command is issued by a user via a telephone or a facsimile machine at a remote location, and the command includes user identification data, password data, online-specified facsimile destination data, and e-mail reading mode data.

When data is given in the form of "#0aaaa", "#0" is the identifier indicating that the data is user identification data and "aaaa" is the user identification number.

When data is given in the form of "#1bbbb", "#1" is the identifier indicating that the data is password data and "bbbb" is the password number.

When data is given in the form of "#2 cccccccc", "#2" is the identifier indicating that the data represents the online-specified destination, and "cccccccc" represents the destination of facsimile transmission.

When data is given in the form of "#3de", "#3" is the identifier specifying the mail reading mode wherein if "d" is equal to "0" then all data is read while only the header of a mail is read if "d" is equal to "1", and wherein if "e" is equal to "1" then the e-mail file is deleted from the e-mail server after reading it while the e-mail file is not deleted if "e" is equal to "0".

The flow charts shown in FIGS. 9 and 10 illustrate the incoming call reception process performed by the CPU 10-3 when an incoming call arrives at the e-mail/facsimile machine 1-11 via the public communication line (PSTN or ISDN). The process shown in these flow charts is performed in accordance with the computer program stored in the ROM 10-2.

In step 9-2, the CPU 10-3 determines whether there is an incoming call via the public communication line (PSTN or ISDN). If the CPU 10-3 receives an incoming call detection signal from the line I/F 10-6, then the CPU 10-3 determines that an incoming call has arrived. If an incoming call has arrived via the public communication line, then the program goes to step 9-3 and the CPU 10-3 determines whether the incoming call includes an information receiving terminal seizing signal associated with a caller's telephone number informing service. The e-mail/facsimile machine according to the present embodiment of the invention has the capability of dealing with a signal representing the telephone number of a caller, which is provided as one of various services of the public communication network. If the CPU 10-3 detects an information receiving terminal seizing signal when an incoming call arrives via the public communication line, then the CPU 10-3 proceeds to step 9-4 and determines whether the caller's telephone number has been received correctly via the public communication line. If the caller's telephone number has been received correctly, then in step 9-5 the CPU 10-3 temporarily stores the received data representing the calling party's telephone number in the RAM 10-4 so that the online-specified facsimile destination is represented by the data stored in the RAM 10-4. Then in step 9-6, the CPU 10-3 determines whether the line I/F 10-6 receives a secondary call via the public communication line. If a secondary call is detected, then the program goes to step 9-7.

In the case where in step 9-3 no information receiving terminal seizing signal is received via the public communication line, the program goes to step 9-7. If the public communication line is ISDN, caller identification data identifying a caller is included in the incoming call, and thus steps 9-3, 9-4, and 9-6 are unnecessary. In this case, the received caller identification data is stored as the online-specified facsimile destination data into the RAM 10-4 in step 9-5, and the program goes to step 9-7.

In step 9-7, the CPU 10-3 transmits a voice guidance 1 (voice message 1) via the line I/F 10-6 over the public communication line. The voice guidance 1 tells for example "This machine has the capability of e-mail to facsimile data conversion. If you want to convert the e-mail data into the form of facsimile data, please enter a 4-digit user identification number following #0, then a 4-digit password following #1, and finally, following #2, a telephone number to which you want to transfer the facsimile data. If the destination of facsimile transmission has already been registered, you don't need to enter the telephone number to specifying the destination. If you enter #30, then you can receive by facsimile all contents of the e-mails currently stored in your mail box. Please enter # at the and after entering all data."

Then in step 9-8, the CPU 10-3 determines whether a predetermined time has elapsed from the start of the voice guidance 1. If the predetermined time has elapsed, then the program goes to step 9-19 to perform a facsimile reception process. If the predetermined time has not elapsed yet, then the CPU 10-3 determines in step 9-9 whether a tone signal (CNG signal) is received which indicates that the call originated from a facsimile machine. Furthermore, it is determined in step 9-10 whether a tone signal (DTMF signal) is received, and further in step 9-11 whether a tone signal including a single "#" is received. If a tone signal including a single "#" is received, the CPU 10-3 determines that the input of the remote operation command by means of the DTMF signals is completed, and the program goes to step 9-12. In the case where a CNG signal is received in step 9-9, the program goes from step 9-9 to step 9-19 and performs a facsimile data reception process. In the case where DTMF signals are received, data represented by the tone signals is stored in the RAM 10-4.

In step 9-12, the CPU 10-3 analyzes the DTMF signal data which has been received and is now held in the RAM 10-4. In step 9-13, the CPU 10-3 determines whether the received DTMF signal data can be interpreted. If it cannot be interpreted, then the program goes to step 9-20 and the CPU 10-3 transmits a voice guidance 2 (saying, for example, "The entered data is wrong. Please enter the correct data.") via the line I/F 10-6 over the public communication line. Then in step 9-23, the seized public line is released and the incoming call reception process is terminated.

In the case where it is determined in step 9-13 that the received DTMF signal data can be interpreted, the program goes to step 9-14 and the CPU 10-3 compares the user identification number extracted from the received DTMF signals with the 10 user identification data in the post office array of the management data shown in FIG. 12. If the user identification number extracted from the received DTMF is not coincident with any user identification data, then the program goes to step 9-21 and the CPU 10-3 transmits a voice guidance 3 (saying, for example, "The user identification number is wrong. Please enter the correct number." via the line I/F 10-6 over the public communication line. After that, the seized line is released and the incoming call reception process is terminated.

On the other hand, if user identification data is found which is coincident with the user identification number received via the line, then the program goes to step 9-15 and the CPU 10-3 compares the password received as the DTMF signal with the password data in the post office array corresponding to the user identification data which has been found to be valid. If they are not coincident with each other, then the program goes to step 9-22, and the CPU 10-3 transmits a voice guidance 4 (saying, for example, "The password is wrong. Please enter the correct password." via the line I/F 10-6 over the public communication line. After that, the seized line is released and the incoming call reception process is terminated.

Alternatively, after transmitting a voice guidance in any of steps 9-20, 9-21, and 9-22, the program may return to step 9-7 so as to again perform the DTMF signal reception process. In the case where the password is found to be valid, the program goes to step 9-16 and the CPU 10-3 determines whether the online-specified destination of facsimile transmission is given. If the online-specified destination of facsimile transmission is given and if the caller's telephone number has been stored as the online-specified destination of facsimile transmission in the RAM 10-4 in step 9-5, then the CPU 10-3 stores, in step 9-17, the given destination data into ONLINE-SPECIFIED FACSIMILE DESTINATION of the post office array having the user identification data coincident with the user identification number.

Then in step 9-24, the CPU 10-3 transmits a voice guidance 5 (saying, for example, "Your request has been accepted. You can wait until the process is completed while holding the handset or you may put down the handset. The requested e-mail data is automatically transferred to your facsimile machine.") via the line I/F 10-6 over the public communication line.

In step 9-25, the CPU 10-3 performs the communication protocol sequence and also the process shown in the flow chart shown in FIG. 2 so that an e-mail is transferred from the post office, specified by POST OFFICE NAME of the mail post array which was found in step 9-14 to correspond to the user identification number, of the e-mail server specified by E-MAIL SERVER IP ADDRESS in the management data shown in FIG. 11. After completion of the transfer of the e-mail data and the process associated with it (conversion of the e-mail data into the form of image data), the program goes to step 9-26.

In step 9-26, the CPU 10-3 determines whether the public communication line has been released. If it is found that the public communication line is not released, then the program goes to step 9-30 and the CPU 10-3 transmits a voice guidance 6 (saying, for example, "The requested facsimile image data is now ready for transmission. Please press the start button of your facsimile machine, and put down the handset.") via the line I/F 10-6 over the public communication line. Then in step 9-28, the CPU 10-3 transmits the facsimile image data (which has been created by means of conversion from the e-mail data) stored in the storage memory 10-5.

On the other hand, if it is determined in step 9-26 that the public communication line has been released, then the program goes to step 9-27 and the CPU 10-3 automatically makes a call (by means of dialing) via the line I/F 10-6 to the destination specified by ONLINE-SPECIFIED FACSIMILE DESTINATION in the mail post office corresponding to the user identification number which was found to be valid in step 9-14 or to the default facsimile destination. In the following step 9-28, the facsimile image data produced by means of conversion from the e-mail data is transmitted. After completion of the facsimile transmission, the seized line is released, and the incoming call reception process is terminated.

In step 9-25 in the above process, if there is no e-mail in the specified post office of the e-mail server 1-10, a voice guidance is transmitted, in step 9-30, to say "There is no new e-mail data in the specified post office." Then the incoming call reception process is terminated. On the other hand, when the process proceeds via steps 9-26, 9-27, and 9-28, an image message telling that there is no new e-mail data in the specified post office is created and transmitted by facsimile.

As can be seen from the above description, the e-mail/facsimile machine according to the invention has the following advantages.

1. System managers, who manage the information systems such as LANs and e-mail systems in companies, can easily adapt the system to the requirement that user can get access from the outside to the e-mail server via a telephone line (or ISDN) simply by introducing the e-mail/facsimile machine according to the invention without needing any additional expensive devices.

That is, it is possible to easily establish a system which allows users to read electronic information such as e-mails by getting access from the outside to the system installed in a company, simply by connecting the e-mail/facsimile machine according to the invention to the computer network in the company, without having to additionally install an access server dedicated to the operation for accepting access performed from the outside via a telephone line and without having to introduce a system capable of encrypting e-mails. In this technique, it is not required to make a great modification in the existing electronic information system such as an e-mail system. The e-mail/facsimile machine according to the invention can be easily introduced into the system with low installation cost, because the e-mail/facsimile machine is a simple expansion of a conventional facsimile machine. After installing the e-mail/facsimile machine, no complicated maintenance is required.

2. Existing facsimile machines connected to the public switched telephone network can be employed as e-mail clients with which users can read e-mails without having the risk that information is exposed to the outside. This provides great convenience to users of e-mails.

That is, existing facsimile machines can be used as e-mail reading terminals having similar capability to that of dedicated e-mail client devices. This makes it unnecessary for e-mail users to always carry a dedicated e-mail reading terminal, because users can read e-mails at any time as long as a facsimile terminal is available. If the e-mail/facsimile machine according to the invention is introduced to a LAN-connected system, it becomes possible to quickly read e-mails from the outside without needing complicated manual operations. In this technique, e-mails are converted into the form of facsimile data before being transferred via the telephone line. This ensures high security compared to the case where information is transferred via the Internet. That is, this technique provides great convenience and high security in reading e-mails.

If the e-mail/facsimile machine according to the invention is adapted to transfer e-mails in the form of encrypted facsimile data, then the security is further improved.

Although the present invention has been described above with reference to the embodiment of e-mail/facsimile machine, the features and functions realized in the above-described e-mail/facsimile machine may also be realized on a personal computer by installing an application program on it.

Another advantage of the invention is that an e-mail list which is a list of headers of e-mail data transferred from the e-mail server can be output at the e-mail/facsimile machine. This makes it easier to manage e-mails. Thus it becomes possible to correctly get desired e-mails.

A further advantage is that when e-mail data to be transferred from the e-mail server includes some data which cannot be interpreted by the e-mail/facsimile machine or when the memory space is not sufficient to receive e-mail data, a message telling the above fact is output and the e-mail data is held in the e-mail server without being deleted, thereby making it possible for a user to get the e-mail via another device or get the e-mail when the e-mail/facsimile machine has enough memory space.

Although the present invention has been described above with reference to the preferred embodiment, the invention is not limited to the details of the embodiment. Various modifications and changed may be made without departing from the sprit and scope of the present invention.

What is claimed is:

1. A communication device for receiving an e-mail stored in an e-mail server, said device comprising:

communication means for transmitting an e-mail transmission request to the e-mail server and receiving the e-mail transmitted from the e-mail server in response to the transmission request;

memory means for storing the e-mail received from the e-mail server;

acquisition means for acquiring from the e-mail server, before said communication means receives the e-mail from the e-mail server, size information of the e-mail located on the e-mail server;

determination means for determining, based on the size information of the requested e-mail acquired by said acquisition means and an available storage capacity of said memory means, whether the storage capacity of said memory means in the communication device is sufficient to store all data included in the e-mail, wherein, if it is determined that the available storage capacity of said memory means is sufficient to store all the data included in the e-mail, the e-mail server transmits the e-mail entirely to the communication device, otherwise the e-mail server transmits only header data of the e-mail to the communication device;

warning means for, if said determination means determines that the available storage capacity of said memory means of said communication device is not sufficient to store all the data included in the e-mail, visually outputting warning information to the communication device indicating that the e-mail stored in the e-mail server cannot be entirely received; and recording means, wherein said warning means generates a report indicating the warning information and records it using said recording means, wherein said communication device converts a received e-mail into image data and records that e-mail using said recording means.

2. A communication device according to claim 1, wherein, when a plurality of e-mails are stored in the e-mail server, said communication device executes reception of e-mails from the e-mail server in a predetermined order, until said determination means determines that it is impossible to receive an e-mail.

3. A communication method of a communication device, for receiving an e-mail stored in an e-mail server, said method comprising the steps of:

transmitting an e-mail transmission request to the e-mail server and receiving the e-mail transmitted from the e-mail server in response to the transmission request;

storing the e-mail received from the e-mail server in a memory unit;

acquiring from the e-mail server, before receiving the e-mail from the e-mail server, size information of the e-mail located on the e-mail server;

determining, based on the size information of the requested e-mail acquired in said acquiring step and an available storage capacity of the memory unit, whether the storage capacity of the memory unit is sufficient to store all data included in the e-mail, wherein, if it is determined that the available storage capacity of the memory unit in the communication device is sufficient to store all the data included in the e-mail, the e-mail server transmits the e-mail entirely to the communication device, otherwise the e-mail server transmits only header data of the e-mail to the communications device; and, if it is determined in said determining step that the available storage capacity of the memory unit of the communication device is not sufficient to store all the data included in the e-mail, visually outputting warning information to the communication device indicating that the e-mail stored in the e-mail server cannot be entirely received, wherein said step of visually outputting includes generating a report indicating the warning information and recording it using recording means, and wherein a received e-mail is converted into image data and recorded using the recording means.

4. A communication method according to claim 3, wherein the size information includes a size of image data, when an e-mail received from the e-mail server contains image data.

5. A communication method according to claim 3, further comprising the step of, when a plurality of e-mails are stored in the e-mail server, executing reception of e-mails from the e-mail server in a predetermined order, until it is determined in said determining step that it is impossible to receive an e-mail.

6. A computer-readable memory medium storing executable code for performing a communication method of receiving an e-mail stored in an e-mail server, wherein the method comprises the steps of:

transmitting an e-mail transmission request to the e-mail server and receiving the e-mail transmitted from the e-mail server in response to the transmission request;

storing the e-mail received from the e-mail server in a memory unit;

acquiring from the e-mail server, before receiving the e-mail from the e-mail server, size information of the e-mail located on the e-mail server;

determining, based on the size information of the requested e-mail acquired in said acquiring step and an available storage capacity of the memory unit, whether the storage capacity of the memory unit in the communication device is sufficient to store all data included in the e-mail, wherein, if it is determined that the available storage capacity of the memory unit is sufficient to store all the data included in the e-mail, the e-mail server transmits the e-mail entirely to the communication device, otherwise the e-mail server transmits only header data of the e-mail to the communication device; and, if it is determined in said determining step that the available storage capacity of the memory unit of the communication device is not sufficient to store all the data included in the e-mail, visually outputting warning information to the communication device indicating that the e-mail stored in the e-mail server cannot be entirely received, wherein said step of visually outputting includes generating a report indicating the warning information and recording it using recording means, and wherein a received e-mail is converted into image data and recorded using the recording means.

7. A memory medium according to claim 6, wherein the size information includes a size of image data, when an e-mail received from the e-mail server contains image data.

8. A memory medium according to claim 6, wherein the method further comprises the step of, when a plurality of e-mails are stored in the e-mail server, executing reception of e-mails from the e-mail server in a predetermined order, until it is determined in said determining step that it is impossible to receive an e-mail.

9. A communication device according to claim 1, further comprising:

delete request means for requesting deletion of an e-mail stored in the e-mail server based upon a determination by said determining means.

10. A communication method according to claim 3, further comprising the step of requesting deletion of an e-mail stored in the e-mail server based upon a determination in said determining step.

11. A communication device for receiving an e-mail stored in an e-mail server, said device comprising:

a communication unit adapted to transmit an e-mail transmission request to the e-mail server and to receive the e-mail transmitted from the e-mail server in response to the transmission request;

a memory unit adapted to store the e-mail received from the e-mail server;

an acquisition unit adapted to acquire from the e-mail server, before said communication unit receives the e-mail from the e-mail server, size information of the e-mail located on the e-mail server;

a determination unit adapted to determine, based on the size information of the requested e-mail acquired by said acquisition unit and an available storage capacity of said memory unit, whether the storage capacity of said memory unit in the communication device is sufficient to store all data included in the e-mail, wherein, if it is determined that the available storage capacity of said memory unit is sufficient to store all the data included in the e-mail, the email server transmits the e-mail entirely to the communication device, otherwise the e-mail server transmits only header data of the e-mail to the communication device;

a warning unit adapted to, if said determination unit determines that the available storage capacity of said memory unit of said communication device is not sufficient to store all the data included in the e-mail, visually output warning information to the communication device indicating that the e-mail stored in the e-mail server cannot be entirely received; and a recording unit, wherein said warning unit generates a report indicating the warning information and records it using said recording unit, wherein said communication unit converts a received e-mail into image data and records that e-mail using said recording unit.

* * * * *

UNITED STATES PATENT AND TRADEMARK OFFICE
CERTIFICATE OF CORRECTION

PATENT NO. : 6,898,627 B1
APPLICATION NO. : 09/698255
DATED : May 24, 2005
INVENTOR(S) : Kenzou Sekiguchi It is certified that error appears in the above-identified patent and that said Letters Patent is hereby corrected as shown below:

ON TITLE PAGE AT ITEM (30) FOREIGN APPLICATION PRIORITY DATA

"9/200125" should read --9-200125--.

SHEET 6

FIG. 5, "appendid.]" should read --appended.]--.

SHEET 12

FIG. 10, "RETREIVE" should read --RETRIEVE--.

COLUMN 3

Line 22, "FIG. 9" should read --FIG. 9,--.

COLUMN 7

Line 66, "(step in" should read --(in step--.

COLUMN 8

Line 13, "(step in" should read --(in step--;
Line 15, "(step in" should read --(in step--; and
Line 27, "The" should read --the--.

COLUMN 9

Line 36, "competed" should read --completed--.

COLUMN 13

Line 30, "number.""" should read --number.")--;
Line 43, "password.""" should read --password.")--; and
Line 50, "process. In" should read --process. ¶ In--.

COLUMN 15

Line 50, "changed" should read --changes--.

UNITED STATES PATENT AND TRADEMARK OFFICE
CERTIFICATE OF CORRECTION

PATENT NO. : 6,898,627 B1
APPLICATION NO. : 09/698255
DATED : May 24, 2005
INVENTOR(S) : Kenzou Sekiguchi It is certified that error appears in the above-identified patent and that said Letters Patent is hereby corrected as shown below:

COLUMN 18

Line 49, insert: --12. A communication device according to claim 1, wherein the size information includes a size of image data, when an e-mail received from the e-mail server contains image data.--.

Signed and Sealed this

Second Day of October, 2007

JON W. DUDAS
*Director of the United States Patent and Trademark Office*